(12) United States Patent
Sewell (10) Patent No.: US 7,204,672 B2
(45) Date of Patent: Apr. 17, 2007

(54) MULTI-MODAL FORCED VORTEX DEVICE

(75) Inventor: Gary Sewell, Carlisle (GB)

(73) Assignee: Anemoid, LLC, Houston, TX (US)

( * ) Notice: Subject to any disclaimer, the term of this patent is extended or adjusted under 35 U.S.C. 154(b) by 224 days.

(21) Appl. No.: 10/730,611

(22) Filed: Dec. 8, 2003

(65) Prior Publication Data

US 2004/0191063 A1   Sep. 30, 2004

Related U.S. Application Data

(60) Provisional application No. 60/431,776, filed on Dec. 9, 2002.

(51) Int. Cl.
| | |
|---|---|
| F04D 15/00 | (2006.01) |
| B60V 3/02 | (2006.01) |
| B60V 3/06 | (2006.01) |
| B60V 1/04 | (2006.01) |
| B60V 1/11 | (2006.01) |
| B60V 1/14 | (2006.01) |
| B60V 1/16 | (2006.01) |
| B60V 3/08 | (2006.01) |

(52) U.S. Cl. ............... 415/150; 415/159; 415/167; 180/117; 180/123; 180/125; 180/126; 180/127; 180/164; 244/12.2; 244/23 A; 244/62; 244/73 B (58) Field of Classification Search ........ 180/116–130, 180/164; 244/12.2, 23 A, 62, 73 B; 415/150, 415/159, 167
See application file for complete search history.

(56) References Cited

U.S. PATENT DOCUMENTS

| 3,139,947 A | * | 7/1964 | Beardsley | .................. 180/128 |
| 3,187,817 A | * | 6/1965 | Colley | ......................... 180/117 |
| 3,203,645 A | * | 8/1965 | Shaw | .......................... 180/129 |
| 3,208,543 A | * | 9/1965 | Crowley | ...................... 180/121 |
| 3,261,420 A | * | 7/1966 | Schmidt | ....................... 180/122 |
| 3,854,547 A | * | 12/1974 | Hall | ............................. 180/117 |
| 3,892,287 A | * | 7/1975 | Bennett | ....................... 180/164 |
| 3,931,708 A | | 1/1976 | Motycka | |
| 3,932,054 A | | 1/1976 | McKelvey | |
| 4,193,469 A | | 3/1980 | Graf | |
| 4,477,998 A | | 10/1984 | You | |
| 4,776,755 A | | 10/1988 | Bjorkestam et al. | |
| 5,082,079 A | * | 1/1992 | Lissaman et al. | ............ 180/118 |

(Continued)

FOREIGN PATENT DOCUMENTS

GB    2295799 A    6/1996

(Continued)

*Primary Examiner*—Christopher Verdier
(74) *Attorney, Agent, or Firm*—Wong, Cabello, Lutsch, Rutherford & Brucculeri, L.L.P.

(57) ABSTRACT

A multi-modal forced vortex device is described having a top plate and a side wall creating a partially enclosed volume. The top plate includes one or more adjustable fluid openings to permit, or restrict, fluid flow into and out of the partially enclosed volume. Rotating blades housed within the partially enclosed volume are manipulated (through control of their pitch and, possibly, their speed) in conjunction with the adjustable fluid openings to generate a variable magnitude attractive force in a first mode, a variable magnitude down or pushing force in a second mode, a variable magnitude up or lifting force in a third mode or variable magnitude yaw, pitch and roll forces in a fourth mode.

26 Claims, 5 Drawing Sheets

U.S. PATENT DOCUMENTS

| | | |
|---|---|---|
| 5,295,643 A | 3/1994 | Ebbert et al. |
| 5,485,645 A | 1/1996 | Ohtsuki |
| 5,890,441 A | 4/1999 | Swinson et al. |
| 6,059,618 A | 5/2000 | Purnell et al. |
| 6,318,489 B1 * | 11/2001 | McGill ................ 180/164 |
| 6,565,321 B1 | 5/2003 | Illingworth et al. |
| 6,568,630 B2 | 5/2003 | Yoeli |
| 6,588,701 B2 | 7/2003 | Yavnai |
| 6,595,753 B1 * | 7/2003 | Illingworth et al. ........ 416/185 |
| 6,623,352 B2 | 9/2003 | Illingworth |

FOREIGN PATENT DOCUMENTS

| | | |
|---|---|---|
| GB | 2343879 A | 5/2000 |

* cited by examiner

MULTI-MODAL FORCED VORTEX DEVICE

This application is related to U.S. provisional patent application, entitled "Unmanned, Sea, Land, Air, Vehicle, (U.S.L.A.V.): an All Terrain Unmanned, Submersible, Wall Climbing, Flying Vehicle" (Ser. No. 60/431,776), filed 9 Dec. 2002.

BACKGROUND

The invention relates to the area of forced vortex technology. More specifically, but not by way of limitation, the invention is directed to a multi-modal forced vortex device that can generate variable magnitude (1) attractive forces, (2) down or pushing forces, (3) up or lifting forces, and (4) yaw, pitch and roll forces.

In recent years there have been substantial advancements in understanding the physics of forced vortex technology. Generally, when a set of partially enclosed blades is made to rotate, the rotating blades create a positive or negative pressure inside the partially enclosed volume (relative to the environment outside the partially enclosed volume) depending upon the speed and direction of the rotating blades and the amount and direction of fluid (e.g., air or water) flowing through the enclosed volume. When the pressure within the partially enclosed volume is negative relative to the ambient pressure, surrounding fluid rushes into the lower pressure area around the blades creating a down-force on the device housing the rotating blades. Alternatively, when the pressure within the partially enclosed volume is positive relative to the ambient pressure, an up-force is created on the device housing the rotating blades.

Currently, the lift and down-force modes of operation are used across a wide range of fields. For example, airplanes, helicopters and submarines produce propulsive forces based on these principles. In addition, domestic ceiling fans are adjustable to either push down air near the ceiling or lift the air nearer to the ground towards the ceiling. Similarly, variable pitched water-jet propulsors provide forward or reverse motion to ships and submarines. The forced vortex attractive force mode of operation created by this technology has also been used to increase the traction of vehicles on slippery and vertical surfaces and for use as a material handling device.

However, there are still many problems in the area of forced vortex technology. The rotating blades currently used in the forced vortex technology field are often unenclosed or mounted at a fixed angle of attack, thereby greatly limiting their ability to generate more than one type of force (e.g., a downward/pushing force or an upward/lifting force or an attractive/suction force). Other devices have blades mounted directly onto a disk, creating a heavier set of blades that require greater amounts of energy to operate/rotate for a given amount of generated force. Still other devices have a disk partially enclosing the blades which is mounted directly onto a rotating axis. Each of these forced vortex devices are limited to a single mode of operation. Additionally, each forced vortex device is designed to function in a single set of environmental conditions. In addition to these operating limitations, existing forced vortex technologies create safety concerns. For example, blades that become disconnected during operation and which are not enclosed or only partially enclosed create a severe safety risk and can easily cause injury or death.

Thus, it would be beneficial to provide a forced vortex apparatus capable of operating in a number of different modes. It would be a further benefit to provide these capabilities in a device that is inherently safer to operate than existing forced vortex devices.

SUMMARY

In one embodiment, the invention provides a multi-modal forced vortex device comprising a top plate having adjustable fluid passages, a side wall coupled to the top plate to create a partially enclosed volume, a plurality of blades adapted to rotate within the partially enclosed volume, pitch adjustment mechanisms to adjust the pitch of at least one of the blades and a rotating means for rotating the plurality of blades. During operation, a multi-modal forced vortex device in accordance with the invention may be operated in any one of five different modes, depending upon the configuration of its fluid apertures, blade pitch and blade rotational speed and/or direction. In a first (forced vortex) mode, the adjustable fluid apertures are closed and the rotating blades are pitched and rotated to generate an attractive force that pulls the device towards and/or against the surface of any object below it. In a second (down or pushing force) mode, the adjustable fluid apertures are partially or fully opened and the rotating blades are pitched and rotated to generate a downward or pushing force on the device. In a third (up or lifting force) mode, the adjustable fluid apertures are partially or fully opened and the rotating blades are pitched and rotated to generate an upward or lifting force on the device. In a fourth (yaw, pitch and roll) mode, the adjustable fluid apertures are partially or fully opened and the rotating blades are pitched (in unison, counter-unison or independently and/or continuously) away from 0°/90° (relative to their direction of rotation) to generate yaw and/or pitch and/or roll forces on the device. In a fifth (standby) mode, the adjustable fluid apertures may be partially or fully opened or fully closed, and the rotating blades are pitched such that substantially no upward, downward, side or vortex forces are imparted to the device. Alternatively, blade rotation may be stopped to effect the fifth mode.

BRIEF DESCRIPTION OF THE DRAWINGS

A better understanding of the invention can be had when the following detailed description of the preferred embodiments is considered in conjunction with the following drawings, in which.

DETAILED DESCRIPTION

A multi-modal forced vortex device is described. The following embodiments of the invention are designed to generate variable magnitude: attractive forces in a first mode; down or pushing forces in a second mode; up or lifting forces in a third mode; yaw, pitch and roll forces in a fourth mode; and no appreciable forces in a fifth, or standby mode. While described herein as a unitary device, those of ordinary skill in the art will recognize a multi-modal forced vortex device in accordance with the invention can be coupled to a rigid body during use (e.g., a land, sea or aerial vehicle). Accordingly, the embodiments described herein are illustrative only and are not to be considered limiting in any respect.

Figure 1:
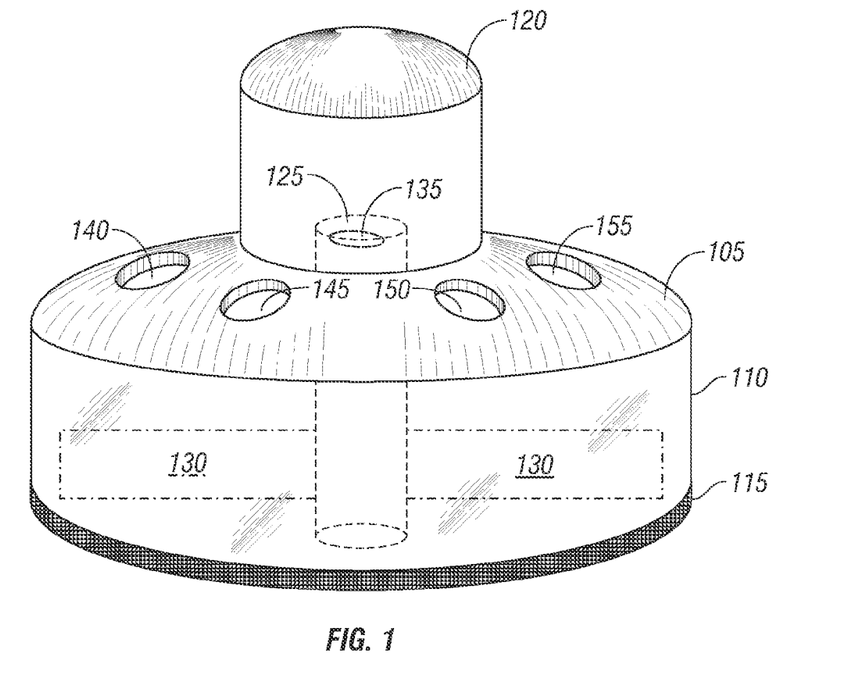
FIG. 1 shows a side view of a multi-modal forced vortex device in accordance with one embodiment of the invention.

Referring to FIG. 1, multi-modal forced vortex device 100 in accordance with one embodiment of the invention comprises top plate 105 and side wall 110 that jointly create a partially enclosed volume, skirt 115 to provide an interface between device 100 and the surrounding environment and power plant 120 to provide the energy to rotate shaft 125 and variable-pitch blades attached thereto (represented in outline as 130).

In one embodiment, top plate 105 and side wall 110 may be constructed of metal that are welded, bolted or clamped together. In another embodiment, top plate 105 and side wall 110 may be constructed of a plastic or composite material that are glued together. In yet another embodiment, top plate 105 may be constructed from a first material and side wall 110 from a different material. One of ordinary skill in the art will recognize that the type of material used to construct a multi-modal forced vortex device in accordance with the invention depends upon the use and/or environment in which it is to operate. For example, device 100 is to be operated in air, blade speeds needed to generate a desired force may be greater than for a similar sized device designed to operate in a more viscous fluid such as water. Accordingly, the strength of the enclosure (top plate, side wall) as well as the material with which the blades are constructed and how they are coupled or fastened to shaft 125, may be entirely different. It will be recognized by those of ordinary skill in the art that the higher or wider side wall 110, the larger the partially enclosed volume created by the combination of top plate 105 and side wall 110. In general, the greater the amount of fluid passing across the blades (that is, through the partially enclosed volume created by top plate 105 and side wall 110), the greater the forced vortex capable of being generated. Additionally, the height of the side wall must accommodate the variation in pitch of rotating blades 130 as they are adjusted for the most efficient angle of attack in a given set of conditions (see discussion below). It is further noted that while the embodiment of FIG. 1 depicts side wall 110 as being substantially perpendicular to top plate 105, the present invention also contemplates coupling side wall 110 at different angles. For example, side wall 110 may be fixed at angles greater or less than ninety degrees to change the volume of fluid inside the partial enclosure created by top plate 105 and side wall 110.

Coupled to side wall 110 and extending downward therefrom, skirt 115 provides a relatively flexible protective ring. One function of skirt 115 is to provide a relatively pliant interface between device 100 and the environment. For example, when operated in a mode to create a down or forced vortex force, skirt 115 may provide a coupling interface to an object. Commensurate with its function, skirt 115 may be embodied in any suitable material such as, for example, plastic or rubber. In addition, skirt 115 may be coupled to side wall 110 using any suitable means such as glue, bolts or a retainer ring. As with the coupling between top plate 105 and side wall 110, the present invention contemplates a smooth fusion between side wall 110 and skirt 115 to reduce the errant eddies and currents associated with turbulent fluid flow between device 100 and its environment. It is noted that while the illustrated embodiment shows skirt 115 to be relatively wide (compared to the height of side wall 110), this is not necessary. Further, depending upon the environment, skirt 115 may not be present in some embodiments of the invention.

Figure 7:
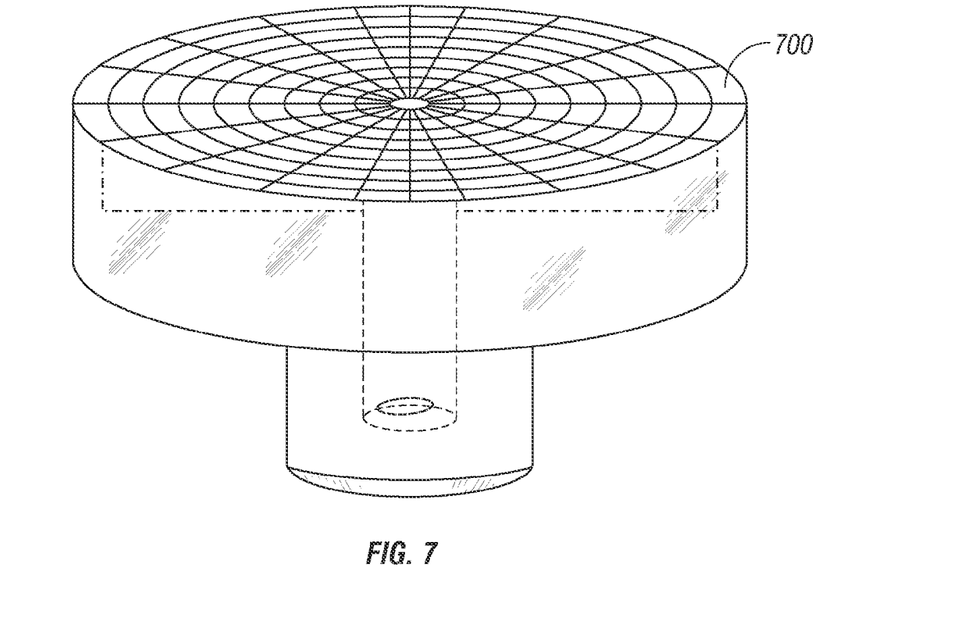
FIG. 7 shows an underside view of a multi-modal forced vortex device in accordance with FIG. 1 and having a mesh cover.

In some embodiments, a porous mesh may be coupled across the bottom of device 100 (i.e., near rotating blades 130) to prevent the uptake of foreign objects into the partially enclosed volume (not shown in FIG. 1). Referring to FIG. 7, for example, porous mesh 700 is shown coupled to the bottom of device 100 (see FIG. 1). If such a mesh is used, it is preferable that it present negligible effect on flow of fluid into and/or away from rotating blades 130. It is further preferable that this mesh be constructed from concentric rings made of metal, plastic or a composite. In another embodiment, the mesh may be mechanically adjustable in the form of an iris so that the degree to which rotating blades 130 are shielded may be varied. As with the coupling between top plate 105 and side wall 110, the present invention contemplates a smooth fusion between side wall 110 or skirt 115 and the protective mesh to reduce the errant eddies and currents associated with turbulent fluid flow between device 100 and its environment.

In the embodiment shown in FIG. 1, top plate 105 includes apertures 135, 140, 145, 150 and 155 which can be "opened" to permit, or "closed" to restrict, fluid flow into or out of the partially enclosed volume created by top plate 105 and side wall 110. Various embodiments of the invention may include more or fewer apertures and may further utilize aperture geometries other than the fixed circular shape illustrated—in some embodiments top plate apertures may have a tapered shape such as an ellipsoid or triangle. In other embodiments, substantially all of top plate 105 not used to provide structural support to side wall 110 and power plant 120, forms a variable diameter iris that can be gradually opened and closed to regulate the amount of restriction presented to fluid moving into and out of the partially enclosed volume created by top plate 105 and side wall 110.

Figure 2:
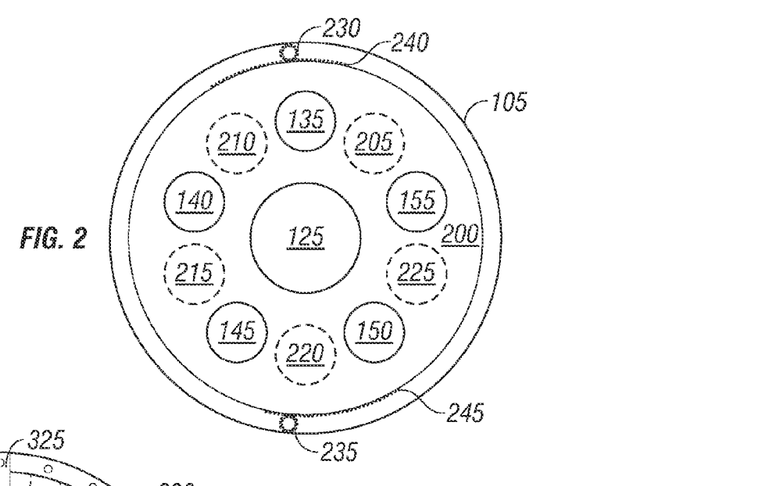
FIG. 2 shows a top view of a multi-modal forced vortex device in accordance with one embodiment of the invention.
Figure 6:
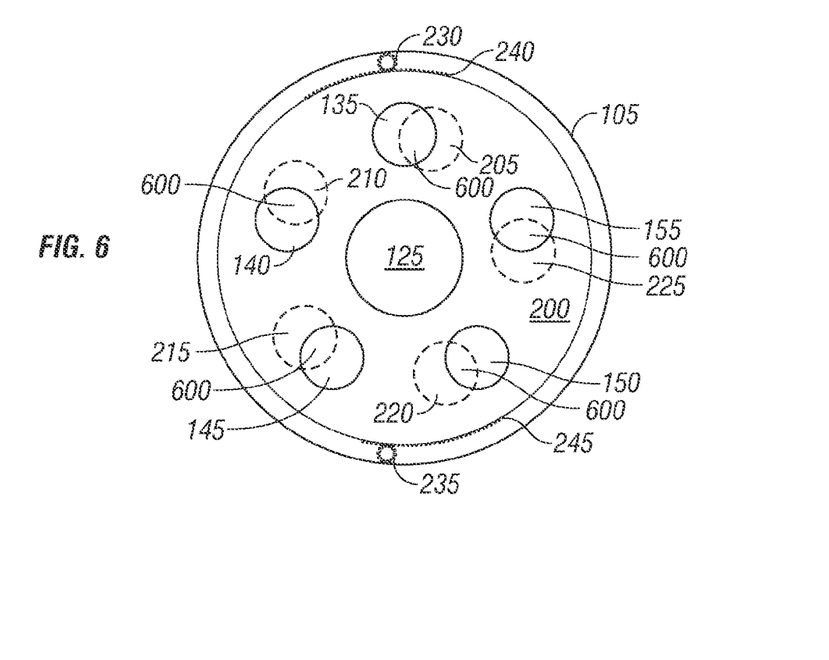
FIG. 6 shows a top view of a multi-modal forced vortex device in accordance with another embodiment of the invention.

With respect to apertures 135–155, in one embodiment top plate 105 is functionally coupled to a lower plate that also has apertures in it. When top plate 105 is moved relative to this lower plate, the apertures between the two may be fully aligned (to permit maximum fluid flow into and out of the partially enclosed volume), fully occluded (to maximally restrict fluid flow into and out of the partially enclosed volume) or partially occluded. Referring now to FIG. 2, top plate 105 is shown over lower plate 200 which has apertures 205, 210, 215, 220 and 225 corresponding to top plate apertures 135–155. In this embodiment, geared shafts 230 and 235 penetrate top plate 105 (and are powered by power plant 120 or a separate power source) and engage gear teeth section 240 and 245 located on the outer circumference of lower plate 200. As geared shafts 230 and 235 are rotated, lower plate 200 is moved relative to top plate 105. In the embodiment shown, geared shafts 230 and 235 may be rotated clockwise and counter-clockwise to align or occlude lower plate apertures 205–225 with top plate apertures 135–155. In another embodiment, the entire circumference of lower plate 205 may comprise gear teeth. A benefit of this approach is that gear shafts 230 and 235 only need be rotated in a single direction. As noted above, the power source to drive (or rotate) gear shafts 230 and 235 may be the same power plant as that used to rotate the enclosed blades (see discussion below), or it may be a separate power source. Also as noted above, the number and shape of apertures may vary. Referring to FIG. 6, for example, there is shown non-circular apertures 600 that result from the above-described case where top plate apertures (e.g., aperture 135) do not fully overlap or coincide with lower plate apertures (e.g., aperture 205). In addition, the number and shape of lower plate apertures do not have to match or equal the number or shape of top plate apertures.

Figure 3:
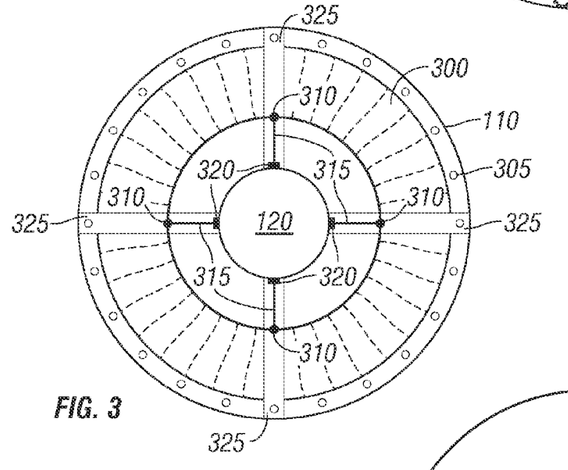
FIG. 3 shows a variable diameter iris mechanism in accordance with one embodiment of the invention.

Referring to FIG. 3, in another embodiment apertures 135–155 and lower plate 200 may be replaced by a variable diameter iris mechanism having a flexible toughened rubber circular iris 300 coupled to side wall 110 using multiple studs or bolds 305. Iris cable bolts 310 attach iris cables 315 to iris 300. At the other end of each iris cable 315 are iris cable actuators 320 which reel iris cables 315 in and out to vary the open aperture of iris 300, thereby varying the restriction presented to fluid flow moving into, or out of, the partially enclosed volume housing blades 130. Beams 325 provide structural support for iris 300.

Figure 9:
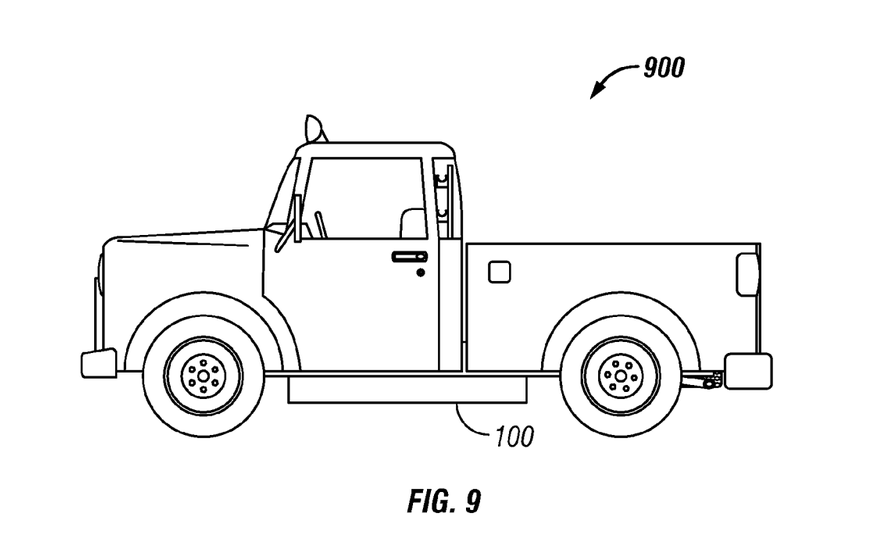
FIG. 9 shows, in block diagram form, a vehicle using a multi-modal forced vortex device in accordance with one embodiment of the invention.

As illustrated in FIG. 1, power plant 120 comprises shaft 125 which tends downward into the partially enclosed volume created by top plate 105 and side wall 110. One function of power plant 120 is to rotate shaft 125 which, in turn, rotates a plurality of variable pitch blades attached thereto within the partially enclosed volume created by top plate 105 and side wall 110. The form of power plant 120 is a design choice of the implementer. For example, power plant 120 may be an internal combustion engine, an electric motor (e.g., a "pancake" motor), a turbine engine (e.g., a gas turbine) or a fuel cell. In other embodiments, power plant 120 may be the power plant of a device to which device 100 is coupled. Referring to FIG. 9, for example, if multi-modal forced vortex device 100 is coupled to vehicle 900, power plant 120 may be the vehicle's engine. In this embodiment, shaft 125 may include universal joints and/or other mechanical means to transfer power from the engine to the blades (see discussion below).

Figure 4:
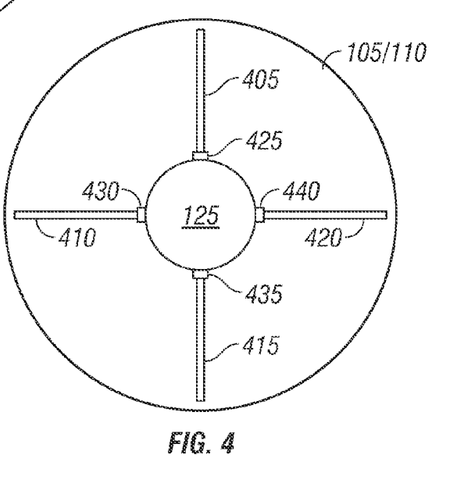
FIG. 4 shows a bottom view of a multi-modal forced vortex device in accordance with one embodiment of the invention.

FIG. 4 shows a bottom view of multi-modal forced vortex device 100 (i.e., looking directly into the partially enclosed volume created by top plate 105 and side wall 110). As shown in this embodiment, blades 130 (see FIG. 1) comprise four separate blades 405, 410, 415 and 420, each of which are coupled to shaft 125 through pitch control units 425, 430, 435 and 440 respectively. In one embodiment, pitch control units 425–440 permit blade rotation from between approximately zero degrees (0°) and approximately ninety degrees (90°). In another embodiment, pitch control units 425–440 permit blade rotation between approximately zero degrees (0°) and approximately one hundred eighty degrees (180°). In yet another embodiment, pitch control units 425–440 permit blade rotation of approximately three hundred sixty degrees (360°). In addition, pitch control units 425–440 may be adapted to control their blades in unison (multiple blades moved or pitched in the same direction and degree—also known as "collective pitch control" in the fields of helicopter and waterjet propulsor design), in counter-unison (multiple blades moved or pitched in opposite directions and degree) or independently (each blade may be pitched independent of other blades). Pitch control units 425–440 may be also be adapted to continuously vary the pitch of each blade as it rotates. This latter embodiment will be recognized as "cyclic pitch control" as used in many current helicopter rotor designs. Pitch control devices in accordance with the invention may be of any type suitable to adjust the pitch of a rotating blade. One of ordinary skill in the art will recognize that the precise type of control element can depend upon, inter alia, the weight, rotational speed and expected generated forces device 100 is designed to produce. In general, then, pitch control devices include swash plates, hydraulic or pneumatic actuators, electric motors, electromagnets and the like.

Figure 5A:
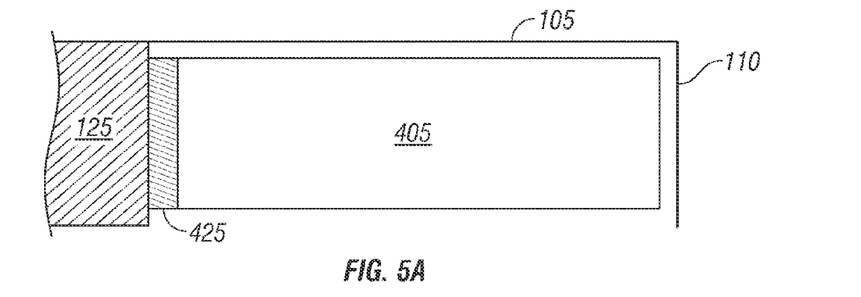
FIGS. 5A, 5B, 5C and 5D illustrate four examples of an independently adjustable blade for use in a multi-modal forced vortex device.
Figure 5B:
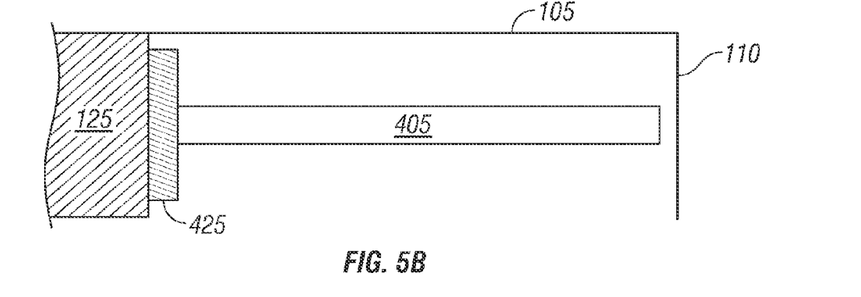
Figure 5C:
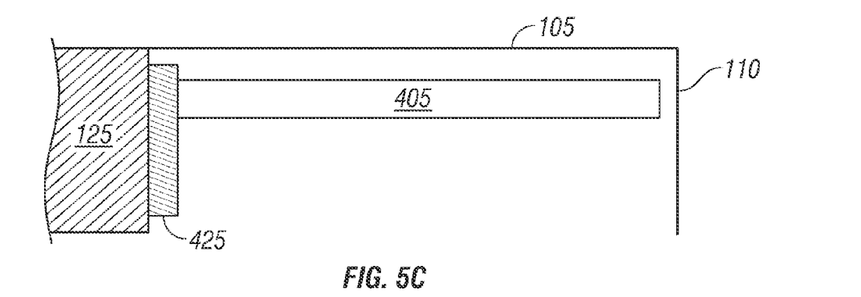
Figure 5D:
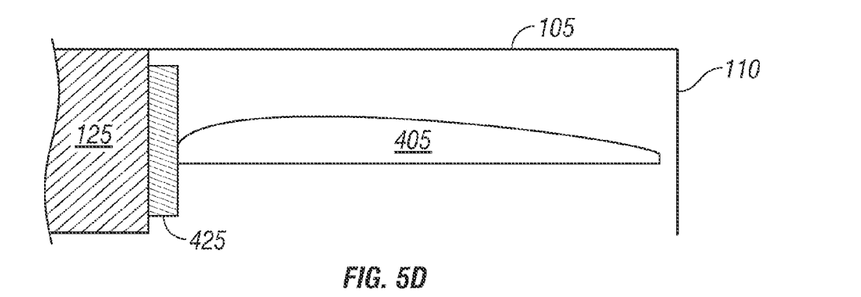

Referring to FIG. 5A, blade 405 is shown in a "full pitch" or 90° pitch position. In this configuration, blade 405 sweeps out its maximum volume as it rotates about shaft 125. Referring now to FIG. 5B, blade 405 is shown in a "no pitch" or 0° pitch position. In this configuration, blade 405 sweeps out its minimum volume as it rotates about shaft 125. In another embodiment, blades 405–425 are pitched relative to their "top" edge as illustrated in FIG. 5C. In this embodiment, blade 405's top edge is continuously maintained in a close spatial relationship to the bottom of top plate 110 (or lower plate 200). Blade 405 in FIG. 5C is shown in its no-pitch position. As shown in FIGS. 4 and 5, the tips of blades 405, 410, 415 and 420 sweep as close to side wall 110 as reasonable when in either the full or no pitch positions. Similarly, it is significant (although not required) that blades 405, 410, 415 and 420 sweep as close to top plate 105 as reasonable when in the no full position and, in the embodiment of FIG. 5C, when in the full pitch or no pitch positions.

A multi-modal forced vortex device in accordance with the invention contemplates using various shaped blades. In one embodiment, for example, each blade has an aerofoil cross-section and is rectangular in overall shape. In another embodiment, the blades may be tapered at one or both ends. In still another embodiment, the blades may be oval in shape.

In operation, multi-modal forced vortex device 100 may be operated in any one of five different modes, depending upon the configuration of its fluid apertures, blade pitch, rotational speed and, possibly, rotational direction. In a first (forced vortex) mode, apertures 135–155 are closed and rotating blades 405–420 are not in the no pitch position so that an attractive force is created by the generated forced vortex that pulls device 100 towards and/or against the surface of any object below it. It will be recognized that, for a given blade size, the magnitude of the generated attractive force in this mode depends upon the blades' rotational speed and the degree to which the blades are pitched—with maximum force generated in the full pitch position. In a second (down or pushing force) mode, apertures 135–155 are partially or fully opened and rotating blades 405–420 are pitched to a negative angle of attack (relative to their direction of rotation) so that a downward or pushing force is created on device 100. In a third (up or lifting force) mode, apertures 135–155 are partially or fully opened and rotating blades 405–420 are pitched to a positive angle of attack (relative to their direction of rotation) so that an upward or lifting force is created on device 100. In a fourth (yaw, pitch and roll) mode, apertures 135–155 are partially or fully opened and the rotating blades 405–420 are pitched (in unison, counter-unison or independently and/or continuously) away from 0°/90° (relative to their direction of rotation) to generate yaw and/or pitch and/or roll forces on device 100. In a fifth (standby) mode, apertures 135–155 may be partially or fully opened or fully closed, and rotating blades 405–420 are pitched at 0° so that substantially no upward, downward, side or vortex forces are imparted to device 100. Alternatively, blade rotation may be stopped to effect the fifth mode. (If blade rotation is stopped, blade pitch angle is irrelevant.) In those embodiments utilizing pitch control units capable of pitching blades between approximately 0° and 360°, device 100 may be transitioned between modes 1 and 3 or 2 and 3 without the need to change the blades' rotational direction. In those embodiments utilizing pitch control units capable of pitching blades between approximately 0° and 90°, device 100 may be transitioned between modes 1 and 3 or 2 and 3 by reversing the blades direction of rotation.

By way of example only, one embodiment of multi-modal forced vortex device 100 uses a circular top plate having a 0.5 meter diameter, a side wall of approximately 3 cm, a skirt of approximately 1 cm, eight (8) blades, each of which are rectangular in shape (25 cm×3 cm×8 mm) with an aerofoil cross-section, a 2 kilowatt electric motor power plant capable of rotating the blades at a maximum of 5,000 rpm (in air), and eight independent electromagnetic pitch control units to provide 360° pitch control. In this embodiment, the top plate, side wall and blades are constructed of a carbon fibre composite and the skirt is a neoprene rubber. In this configuration, device 100 has a mass of approximately 20 Kg, but can generate an attractive force (mode 1) of approximately 1,000 Newtons, pushing (mode 2) and lifting (mode 3) forces of approximately 2,000 Newtons and yaw, pitch and roll (mode 4) forces of approximately 1,500 Newtons.

In another embodiment, the top plate comprises a surface having a substantially circular cross section. A first plurality of fixed sized openings in the top plate comprises holes having a substantially circular cross section. A second plurality of fixed sized openings is provided in a lower plate. The first and second plurality of fixed sized openings have substantially the same cross sectional shape. Gear teeth are provided on at least a portion of an outer edge of the lower plate. The side wall is coupled at an approximately ninety degree angle relative to a top surface of the top plate. The partially enclosed volume comprises a substantially circular cross-section. The blades are adapted to sweep out substantially all of the partially enclosed volume when in a first position. The pitch adjustment mechanisms adjust the pitch between approximately plus and minus ninety degrees relative to a vertical position. At least one of the top plate and side wall comprise a metal. At least one of the top plate and side wall comprise a composite. At least one of the top plate and side wall comprise a plastic. The device may be coupled to an automobile.

Figure 8:
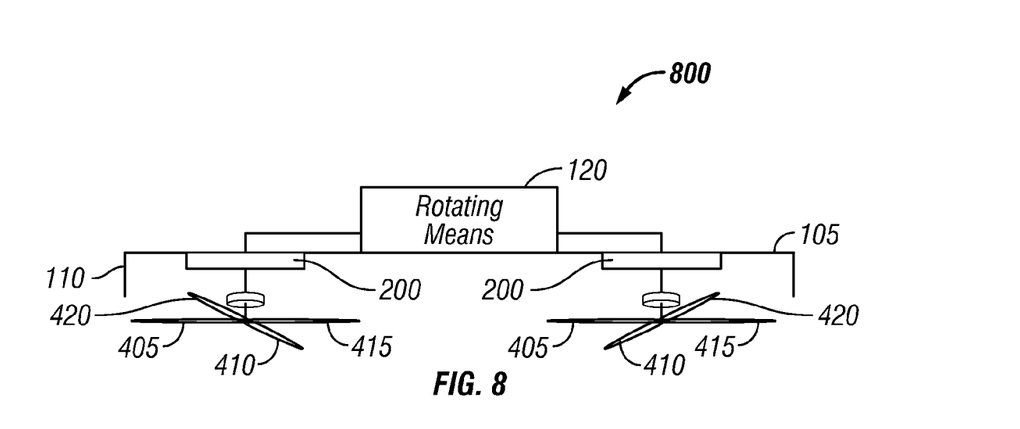
FIG. 8 is a block diagram of a multi-modal forced vortex device in accordance with yet another embodiment of the invention.

Various changes in the materials and structure of the illustrated embodiments are possible without departing from the scope of the claims. For instance, the number of blades is not restricted to the four-blade embodiments described herein. It is contemplated that, depending upon the physical size of device 100 (which can vary from millimeters to several meters in diameter), anywhere from 2 to 72 blades (rotating up to approximately 40,000 rpm) may be used. It is further noted that while the illustrated embodiments utilize fluid apertures having a circular cross section, this is not necessary. Nor is it necessary that the top plate have a circular cross-section. It will also be recognized that numerous devices may be connected together in any number of configurations, separated by varying horizontal and vertical distances from one another. See, for example, vortex device 800 in FIG. 8. For example, two multi-modal forced vortex devices in accordance with the invention may be mounted back-to-back to form a contra-rotating assembly. One benefit of this embodiment is that one of the two devices act as an anti-torque device to the other device. Thus, while the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A multi-modal forced vortex device, comprising:
   a top plate having a first plurality of fixed sized openings;
   a lower plate juxtaposed with the top plate and having a second plurality of fixed sized openings;
   an adjustment means for moving the lower plate relative to the upper plate whereby the second plurality of fixed sized openings can be aligned with the first plurality of fixed sized openings;
   a side wall coupled to the top plate to create a partially enclosed volume;
   a plurality of blades adapted to rotate within the partially enclosed volume;
   pitch adjustment means for adjusting the pitch of at least one of the blades; and
   a rotating means for rotating the plurality of blades.

2. The device of claim 1, wherein the top plate comprises a surface having a substantially circular cross-section.

3. The device of claim 1, wherein the adjustment means is further adapted to move the lower plate relative to the upper plate whereby the second plurality of fixed sized openings can be partially aligned with the first plurality of fixed sized openings.

4. The device of claim 1, wherein the first plurality of fixed sized openings comprise holes having a substantially circular cross-section.

5. The device of claim 1, wherein the first plurality of fixed sized openings and the second plurality of fixed sized openings have substantially the same cross-sectional shape.

6. The device of claim 1, wherein the adjustment means comprises:
   gear teeth on at least a portion of an outer edge of the lower plate;
   a shaft having a first end, wherein the first end has gear teeth operatively coupled to the gear teeth on the outer edge of the lower plate; and
   a power source adapted to rotate the shaft.

7. The device of claim 1, wherein the side wall is coupled at an approximately ninety degree (90°) angle relative to a top surface of the top plate.

8. The device of claim 1, wherein the partially enclosed volume comprises a substantially circular cross-section.

9. The device of claim 1, wherein the blades are adapted to sweep out substantially all of the partially enclosed volume when in a first position.

10. The device of claim 1, wherein the pitch adjustment means is adapted to adjust the pitch of the at least one blade through approximately 360 degrees.

11. The device of claim 1, wherein the pitch adjustment means is adapted to adjust the pitch of the at least one blade through between approximately plus and minus ninety degrees (90°) relative to a vertical position.

12. The device of claim 1, wherein each of the plurality of blades is coupled to a separate pitch adjustment means.

13. The device of claim 12, wherein each of the plurality of pitch adjustment means adjusts the pitch of a blade independently of the action of any other one of the pitch adjustment means.

14. The device of claim 1, wherein the blades comprise an aerofoil cross-section.

15. The device of claim 1, wherein the blades comprise a rectangular shape.

16. The device of claim 1, further comprising a skirt coupled to the side wall and extending below the side wall.

17. The device of claim 1, further comprising a porous mesh coupled to a side of the side wall opposite the top plate and extending across the device in a plane substantially parallel to the top plate.

18. The device of claim 1, wherein the rotating means is adapted to adjust the speed of rotation of the plurality of blades.

19. The device of claim 1, wherein the rotating means comprises an electric motor.

20. The device of claim 1, wherein the rotating means is selected from the group consisting of an internal combustion engine, a fuel cell and a gas turbine.

21. The device of claim 1, wherein at least one of the top plate and side wall comprise a metal.

22. The device of claim 1, wherein at least one of the top plate and side wall comprise a composite.

23. The device of claim 1, wherein at least one of the top plate and side wall comprise a plastic.

24. A vehicle having coupled thereto a device comprising:
a top plate having a first plurality of fixed sized openings;
a lower plate juxtaposed with the top plate and having a second plurality of fixed sized openings;
an adjustment means for moving the lower plate relative to the upper plate whereby the second plurality of fixed sized openings can be aligned with the first plurality of fixed sized openings;
a side wall coupled to the top plate to create a partially enclosed volume;
a plurality of blades adapted to rotate within the partially enclosed volume;
pitch adjustment means for adjusting the pitch of at least one of the blades; and
a rotating means for rotating the plurality of blades.

25. The vehicle of claim 24, wherein the vehicle comprises an automobile.

26. The vehicle of claim 24, wherein the vehicle comprises a submersible vehicle.

* * * * *